(12) United States Patent
Endo

(10) Patent No.: US 7,561,313 B2
(45) Date of Patent: Jul. 14, 2009

(54) IMAGE SCANNER AND IMAGE SCANNING METHOD

(75) Inventor: Katsuyuki Endo, Marsumoto (JP)

(73) Assignee: Seiko Epson Corporation, Shinsuku-Ku, Tokyo (JP)

( * ) Notice: Subject to any disclaimer, the term of this patent is extended or adjusted under 35 U.S.C. 154(b) by 688 days.

(21) Appl. No.: 10/897,678

(22) Filed: Jul. 23, 2004

(65) Prior Publication Data

US 2005/0057785 A1    Mar. 17, 2005

(30) Foreign Application Priority Data

Jul. 29, 2003    (JP) .............................. 2003-203103

(51) Int. Cl.
   *H04N 1/04*    (2006.01)
   *B41J 11/54*   (2006.01)
   *B65H 5/00*    (2006.01)

(52) U.S. Cl. ...................... 358/496; 400/596; 271/225

(58) Field of Classification Search ................ 358/488, 358/496, 498; 399/9, 13, 18, 268, 283, 267, 399/371
   See application file for complete search history.

(56) References Cited

U.S. PATENT DOCUMENTS

| 4,996,604 | A | | 2/1991 | Ogawa et al. | |
|---|---|---|---|---|---|
| 5,103,322 | A | * | 4/1992 | Beck et al. | ................... 358/496 |
| 6,026,723 | A | * | 2/2000 | Sakai | ........................... 83/221 |
| 6,034,784 | A | * | 3/2000 | Gatto et al. | ................ 358/1.18 |
| 6,257,783 | B1 | * | 7/2001 | Hanaoka et al. | ............. 400/578 |
| 6,297,491 | B1 | * | 10/2001 | Mangerson | ............... 250/208.1 |
| 6,333,499 | B1 | | 12/2001 | Sato | |
| 2004/0100669 | A1 | * | 5/2004 | Tecu et al. | ................... 358/497 |

FOREIGN PATENT DOCUMENTS

| EP | 0 554 476 A1 | 8/1993 |
|---|---|---|
| JP | 58-204669 | 11/1983 |
| JP | 64-37161 | 3/1989 |
| JP | 6-30192 | 2/1994 |
| JP | 09006928 | 1/1997 |
| JP | 11-155044 | 6/1999 |
| JP | 11-284801 | 10/1999 |
| JP | 11284801 | 10/1999 |
| JP | 2000-196816 | 7/2000 |
| JP | 2002-56439 | 2/2002 |

* cited by examiner

*Primary Examiner*—Twyler L Haskins
*Assistant Examiner*—Barbara D Reinier

(57) ABSTRACT

An image scanner and image scanning method to reliably image scanned media in an image scanning apparatus with consistent quality. The image scanning apparatus may be included within a printer 10 for printing to the medium. The image scanning apparatus comprises a transportation mechanism for transporting a card C along a transportation path 41 from an insertion opening 41 and an image sensor 44 to image the card on the transportation path 41. Guide walls 54 guide the card C into alignment with the transportation path 41. The transportation mechanism conveys the card C in a forward direction toward the image sensor 44 to a specified indexing position, and then in reverse toward the insertion opening 41*a*. The image sensor 44 images the card C as the card C is transported in reverse from the indexing position. The card C is then discharged from the card insertion opening 41*a*.

16 Claims, 13 Drawing Sheets

IMAGE SCANNER AND IMAGE SCANNING METHOD

BACKGROUND OF THE INVENTION

1. Field of Technology

The present invention relates to an image scanner and to an image scanning method for reading images from media such as paper and cards.

2. Description of Related Art

Image scanners are commonly used to acquire image data from paper, cards, and other types of media (referred to below as the "scanned medium" or "original"). Image scanners image the scanned medium by emitting light to the scanned medium from LEDs or other light sources in a scan head with the scan head effectively in contact with the scanned medium, and then detecting the light reflected from the scanned medium with image sensors also disposed to the scan head.

Image scanners are available in two general types: flatbed and sheetfed. With flatbed scanners the original is placed on a document glass and the scan head moves across the document surface to image the original. With sheetfed image scanners, however, the scan head remains stationary while the original is conveyed past the scan head while being pressed to the scan head to image the original.

Flatbed scanners tend to be large because there must be sufficient space inside the scanner to house the mechanism for moving the scan head. Sheetfed scanners can therefore be easily made smaller than flatbed scanners.

FIG. 13 is a schematic diagram of a conventional sheetfed image scanner 200. With this scanner 200, original sheets P placed on a supply tray 202 are raised by a raising/lowering tray 203, picked up by the supply roller 204, and conveyed from the insertion slot F into the scanner 200. The sheet P is then transported by the separation roller pair 205 and feed roller pair 206 to the image sensor 201, and the original is imaged by the image sensor 201. The imaged sheet P is then discharged by exit roller pair 207 from the exit opening R to the exit tray 208. A scanner like the scanner 200 is known from JP-11-284801-A.

As will be apparent from FIG. 13, the insertion slot F, image sensor 201, and exit opening R are arranged in this order along a straight transportation path, and the scanned medium (original sheet P) is conveyed in one direction in this conventional scanner 200. A problem with this scanner 200, therefore, is that if the scanner is placed with the insertion slot F at the front, the scanned medium is discharged from the back of the scanner 200. This makes it difficult to remove the scanned media, and operation is inconvenient.

Furthermore, if the original is inserted skewed to the transportation path of the image scanner, it is either conveyed diagonally through the transportation path or the direction of travel is corrected by a guide member in the transportation path, and the original is therefore either imaged at an angle or the captured image is turned partway through. If the original is an identification card containing a photograph of the individual's face, this can result in a distorted image of the individual's face or even render the captured image unusable as data for individual identification.

In addition, if the scanned medium is inserted at an angle to the image scanner, the medium could become stuck inside the transportation path, resulting in a paper jam.

Multiple detectors (such as a paper insertion detector, a leading edge detector, trailing edge detector, and discharge detector) are also needed if skewed insertion of the original to the image scanner is to be detected and corrected before the user sees the captured image and only then realizes the skew. This increases the cost and inhibits reducing the size of the image scanner, and creates increased complexity in that the output signals from the multiple detectors must be processed.

SUMMARY OF THE INVENTION

The present invention is directed to an image scanning apparatus including a transportation mechanism for transporting a medium inserted from an insertion opening along a transportation path; a guide member for guiding the medium into alignment with the transportation path; and an image sensor for scanning an image of the medium transported along the transportation path. The transportation mechanism conveys the medium inserted from the insertion opening in a forward direction toward a specified indexing position downstream of the image sensor, and then in reverse toward the insertion opening. The image sensor images the medium as the medium is transported in reverse from the indexing position, and the transportation mechanism then discharges the medium from the insertion opening.

As the medium is transported forward, it is guided by the guide members and aligned correctly in the transportation path. The correctly aligned medium is then reversed and imaged as the medium returns through the transportation path to the insertion opening. An accurate image of the medium can therefore be easily acquired. After the medium inserted from the insertion opening is imaged, it is then discharged from the same insertion opening. Handling the medium is therefore easier and operability is improved.

The image scanning apparatus preferably also has a medium detector disposed adjacent to the insertion opening or transportation mechanism for detecting presence or absence of the medium in the transportation path; a medium length detector for detecting the length of the medium i.e., the distance traveled by the medium in the transportation direction; a comparator for comparing the detected medium length from the medium length detector with a specified value and a control unit. Based on the comparison result the control unit controls the transportation mechanism to image the medium by means of the image sensor when the medium length is within a specified range or will control the transportation mechanism to discharge the medium from the insertion opening without imaging the medium when the medium length is outside the specified range.

For example, the control unit controls the transportation mechanism to discharge the medium from the insertion opening if the medium length is less than or equal to a first specified value or is greater than or equal to a second specified value, where the first specified value is less than the second specified value.

Insertion and discharge (removal) of the medium can be detected by placing the medium detector adjacent to the insertion opening. Output from the medium detector can then also be used to control driving the transportation mechanism.

Further the control unit should preferably stop imaging the medium by the image sensor and control the transportation mechanism to discharge the medium from the insertion opening if the medium detector detects the medium before the transportation distance of the medium when transported in reverse from the indexing position reaches a third specified value, and if the medium detector does not detect the medium before the transportation distance of the medium when transported in reverse from the indexing position reaches a fourth specified value. The third specified value is less than the fourth specified value.

Transportation of the medium can thus be controlled using a single medium detector. Furthermore, errors occurring while the medium is transported can be appropriately handled. The present invention thus affords a user-friendly, easy-to-use image scanning apparatus.

The image scanning apparatus according to the present invention is ideally suited to applications where a photograph contained on a driver license, credit card with an ID photograph, or other photo ID presented by a customer is captured for verification purposes. The reliability of images captured for verification can thus be improved.

The present invention is also directed to a method for controlling the scanning of an image of a medium being moved along a transportation path using an image sensor.

Other advantages and a fuller understanding of the invention will become apparent and appreciated by referring to the following description and claims taken in conjunction with the accompanying drawings.

DESCRIPTION OF THE PREFERRED EMBODIMENTS

Figure 1:
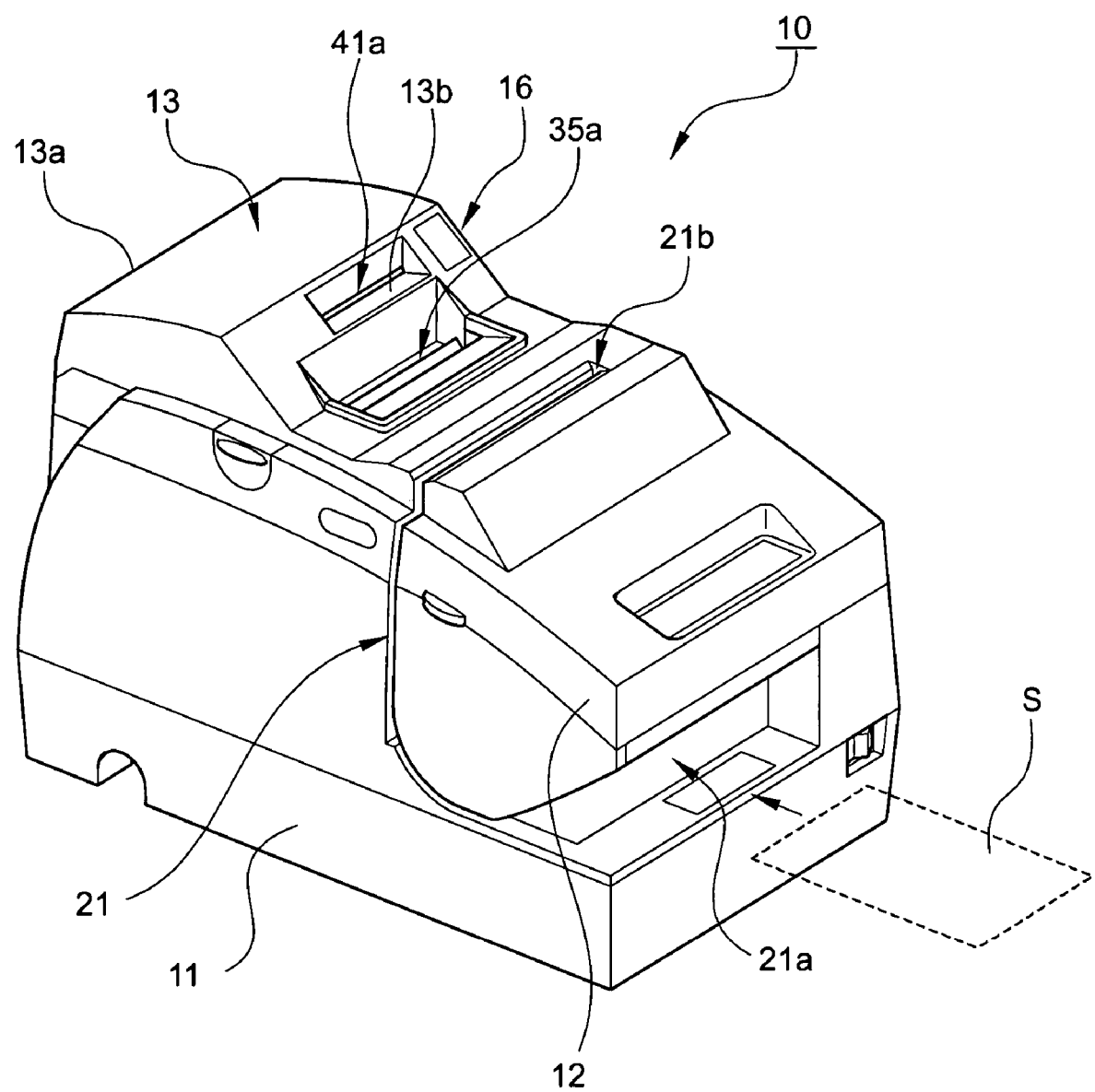
FIG. 1 is an external perspective view of a printer with an image scanning sensor as a first embodiment of an image scanner according to the present invention.

Preferred embodiments of an image scanner and image scanning method according to the present invention are described below with reference to the accompanying figures.

A printer 10 according to this embodiment of the invention, as is more clearly shown in FIGS. 1-5 respectively, can print to both roll paper P and cut sheet paper or slips S, and can scan and image information from both slips S and cards C.

The printer 10 has a unified rear case portion 11, front case portion 12, and top cover portion 13. The rear case portion 11 provides a housing for internally storing roll paper P, and a print mechanism for printing to roll paper P. The front case portion 12 is rendered at the front of the rear case portion 11, and forms a slip insertion opening 210 to a slip transportation path 21 for conveying slips S between the rear case portion 11 and front case portion 12. The top cover portion 13 is assembled covering the top of the rear case portion 11, and houses the card image sensor 44 for imaging information recorded on cards C and other media.

The slip insertion opening 21a for inserting slips S to the slip transportation path 21 is formed at the front of the printer 10, and a slip exit 21b for discharging slips S is formed at the top of the printer 10. Multiple transportation rollers, a magnetic ink character reader (MICR), print head and slip image sensor (none of which are shown) are disposed along the slip transportation path 21. Using these mechanisms, the printer 10 reads magnetic ink characters printed on the slip S, prints to the front and/or back of the slip S, and images (scans to obtain image information) the front of the slip S while conveying the slip S through the transportation path.

A roll paper transportation path 35 is formed between the rear case portion 11 and top cover portion 13. The roll paper P is loaded in a roll paper compartment 30 formed by a roll paper compartment wall 31 inside the rear case portion 11. One end of the roll paper P is pulled out from the roll paper compartment 30 and conveyed by a platen roller 32 through the roll paper transportation path 35 while it is printed by the thermal print head 33. The printed roll paper P is then discharged from the roll paper exit 35a opened between the rear case portion 11 and top cover 13a.

An automatic paper cutter 34 is provided above the platen roller 32 and thermal print head 33. The automatic paper cutter 34 has a fixed blade 34a and movable blade 34b on opposite sides of the roll paper transportation path 35. The movable blade 34b moves toward the fixed blade 34a (in the direction of arrow A in FIG. 2) to slice and cut the roll paper P between the movable blade 34b and fixed blade 34a.

A main structural frame 51 for the top cover portion 13 is located under the top cover portion 13. The rear case portion 11 has a stationary section 53. The frame 51 of the top cover portion 13 is pivotably supported on stationary section 53 by intervening hinge member 52. The roll paper compartment 30 can thus be opened and closed by the top cover portion 13, and roll paper P can be loaded or replaced.

Figure 2:
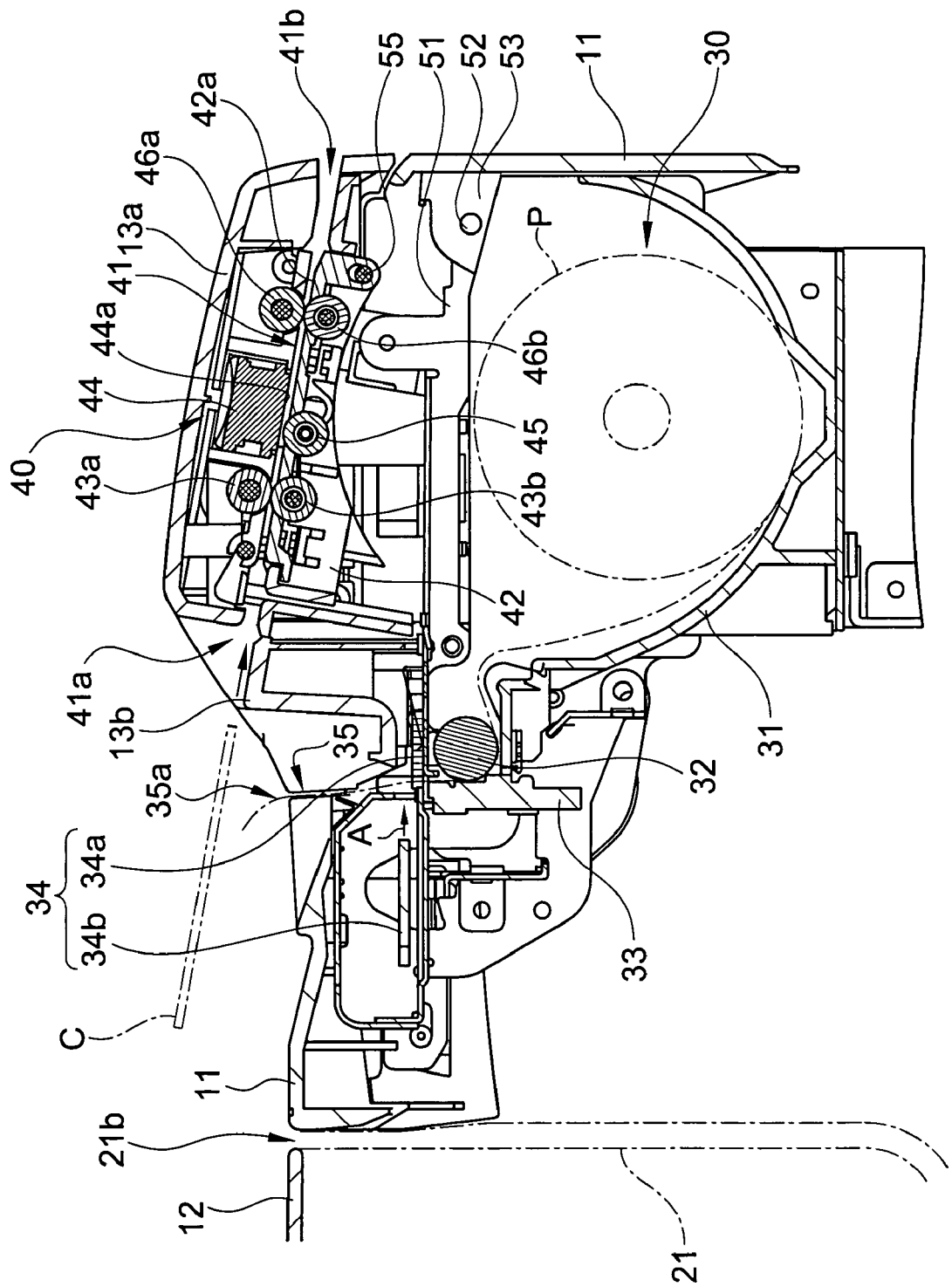
FIG. 2 is a partial sectional view of this printer with an image scanning sensor according to the present invention.

The card image scanning unit 40 is described next. The card image scanning unit 40 comprises a sheetfed image scanner. As shown in FIG. 2, the card image scanning unit 40 is provided between the top cover 13a and roll paper compartment 30, and the image sensor 44 captures an image of a card C as the card C is conveyed from the card insertion opening 41a through the card transportation path 41.

Figure 3:
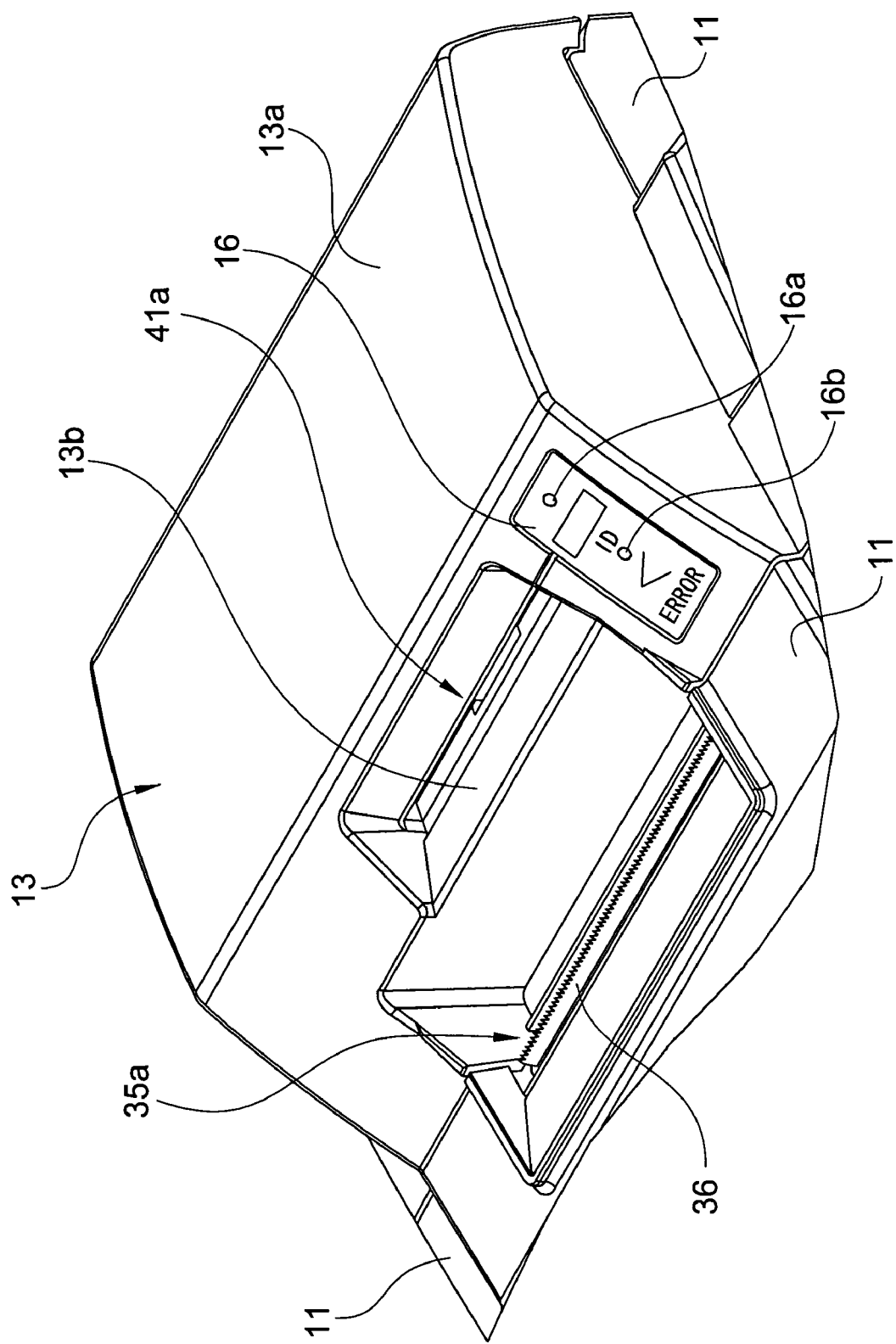
FIG. 3 is an external perspective view of the top cover portion of this printer with an image scanning sensor according to the present invention.

As shown in FIG. 3, a table 13b for guiding and assisting insertion of the cards C is formed in front of the card insertion opening 41a in the top cover 13a. An LED display unit 16 for reporting the status of the printer 10 as it relates to card imaging is provided at the front right side of the top cover 13a where the card insertion opening 41a is formed.

Referring again to FIG. 2, first transportation roller 43a, image sensor 44, and second transportation roller 46a are disposed in sequence from the card insertion opening 41a along the card transportation path 41 on the top side, that is, the top cover 13a side, of the card transportation path 41 in the card image scanning unit 40. A first presser roller 43b, a pressure roller 45, and a second presser roller 46b are disposed on the bottom side, that is, the roll paper compartment 30 side, of the card transportation path 41 at positions opposite the first transportation roller 43a, the image sensor 44, and second transportation roller 46a, respectively.

The first transportation roller 43a and the first presser roller 43b are located between the card insertion opening 41a and the image sensor 44 (that is, upstream of the image sensor 44), and can convey a card C inserted into the card transportation path 41 forward and reverse along the card transportation path 41. The first transportation roller 43a and the first presser roller 43b convey the card C between the image sensor 44 and the pressure roller 45.

The image sensor 44 in this embodiment is a contact image sensor (CIS) for reading text and images from the front of the card C. The pressure roller 45 presses the card C to the scanning surface 44a with pressure appropriate to the card thickness while the image sensor 44 images any text and images on the card C. More specifically, the image sensor 44 emits light to the surface of the card C conveyed through the card transportation path 41, and scanning surface 44a then senses the light reflected from the card C. Numerous photoelectric conversion elements not shown are arrayed lengthwise (that is, perpendicular to the card transportation direction and widthwise to the card C) to the scanning surface 44a in a line, and each of the photoelectric conversion elements outputs an electrical signal according to the detected light.

The second transportation roller 46a and the second presser roller 46b are disposed on the side of the image sensor 44 opposite the first transportation roller 43a and the first presser roller 43b, that is, on the downstream side of the image sensor 44. The second transportation roller 46a and second presser roller 46b can also convey a card C inserted to the card transportation path 41 forward and reverse through the card transportation path 41.

Another opening 41b is formed downstream from the second transportation roller 46a and second presser roller 46b where the card transportation path 41 crosses the top cover 13a. This opening 41b allows a card C inside the card transportation path 41 to be conveyed to the downstream side of the card transportation path 41 and temporarily partially protrude from the back side of the printer 10 while remaining nipped by the second transportation roller 46a and the second presser roller 46b.

The first presser roller 43b, pressure roller 45, and second presser roller 46b disposed on the roll paper compartment 30 side are rotatably supported on an internal cover 42 disposed between the card transportation path 41 and roll paper compartment 30. A card transportation surface 42a forming part of the card transportation path 41 is formed on top of the internal cover 42. The first presser roller 43b, pressure roller 45, and second presser roller 46b protrude in part from the card transportation surface 42a, and can contact the first transportation roller 43a, image sensor 44, and second transportation roller 46a respectively.

Figure 4:
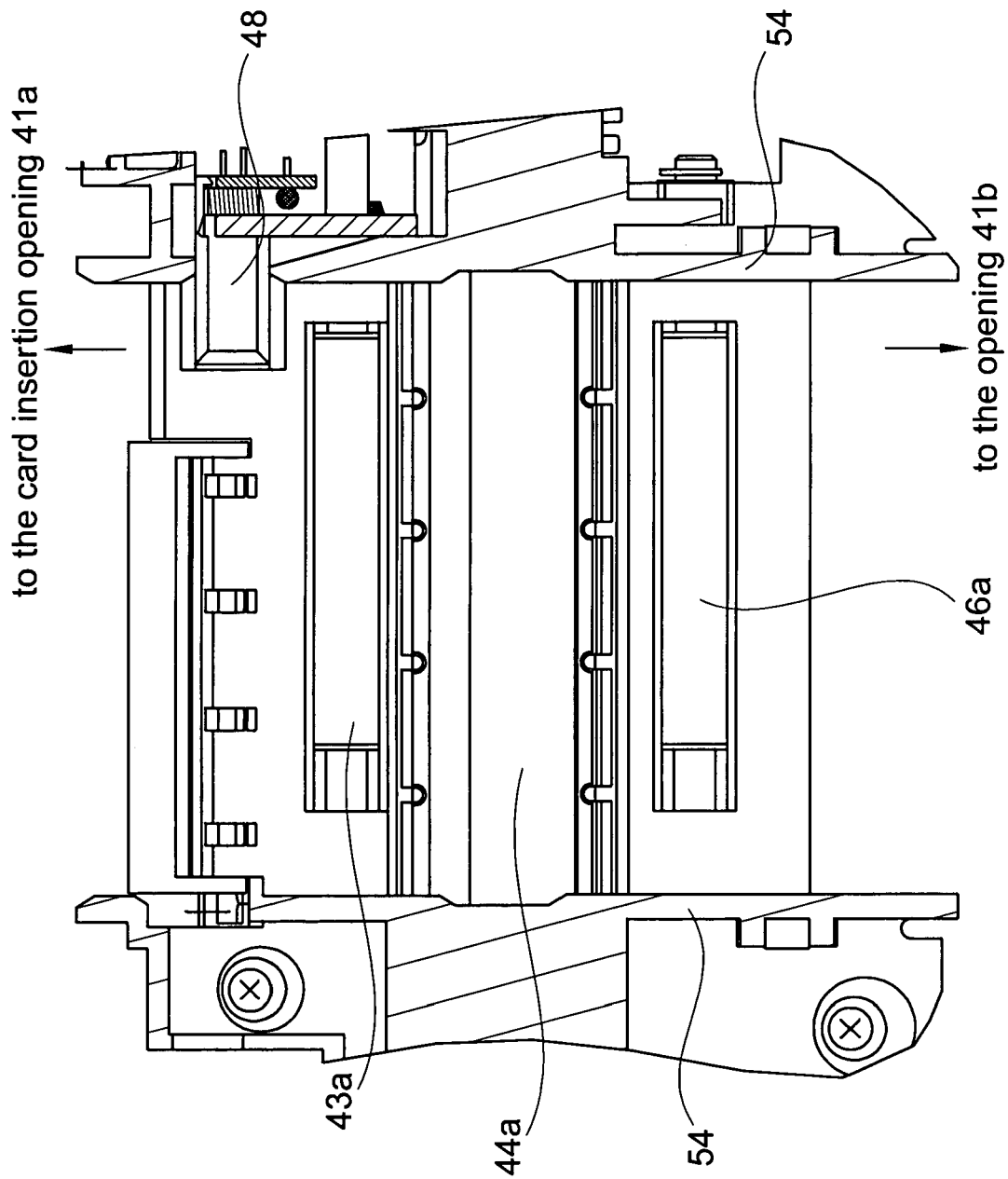
FIG. 4 is a sectional view showing the top side of the card transportation path when the internal cover is open.

FIG. 4 is a section view showing the top side of the of the card transportation path when the internal cover is open. The internal cover 42 is pivotally assembled to guide walls 54 disposed at the frame 51 by way of hinge members 55 (see FIG. 2). The guide walls 54 extend in the card transportation direction on both sides of the card transportation path 41, and rise perpendicularly to the transportation surface of the card transportation path 41 (the scanning surface 44a of the image sensor 44).

The hinge members 55 are provided on the back side of the internal cover 42 (the opening 41b side). When the top cover portion 13 is opened, the front (the card insertion opening 41a side) of the upward-facing internal cover 42 is drawn to the front of the printer 10 and opens down, and parts of the transportation mechanism along the card transportation path 41 can be accessed for maintenance from the front of the printer 10.

The guide walls 54 to which the internal cover 42 is assembled function as guide members for correcting the insertion direction of cards C inserted to the card transportation path 41. For example, if a card C is inserted skewed to the card transportation direction (which is the direction perpendicular to the card insertion opening 41a and parallel to the card transportation surface 42a), the card C will contact and be guided by one of the guide walls 54 as the card C is conveyed by the first transportation roller 43a and second transportation roller 46a, and the card C will thus be aligned with the normal transportation direction. Therefore, even if the card C is inserted skewed to the card transportation direction, the card C will be guided by the guide walls 54 and conveyed in the normal card transportation direction.

It should be noted that the guide walls 54 extend along substantially the entire length of the card transportation path 41 in this embodiment, but the length can be adjusted desirably according to the relationship to the card insertion opening 41a and transportation roller pairs (43a, 43b, 46a, 46b) as long as the guide walls can correct a skew of the scanned medium.

This skew correction of the card transportation direction is completed before the card C completely passes the focal position 44b of the image sensor 44 as the card C is conveyed from the card insertion opening 41a in the forward transportation direction toward the opening 41b by means of the first transportation roller 43a and first presser roller 43b and the second transportation roller 46a and second presser roller 46b. After the card C completely passes the focal position 44b of the image sensor 44, the card C is reversed and information on the card C is imaged by the image sensor 44 while the card C is conveyed from the opening 41b to the card insertion opening 41a. The image sensor 44 thus always images the card C with the card C correctly aligned with the normal card transportation direction.

A card detector 48 is provided in the neighborhood of the card insertion opening 41a to the card transportation path 41. This card detector 48 is a sensor for detecting a card C inserted into the card insertion opening 41a. The first transportation roller 43a and second transportation roller 46a start operating after the card C has been detected by the card detector 48, and inserting a card C triggers starting the operation conveying the card C through the card transportation path 41.

Figure 5:
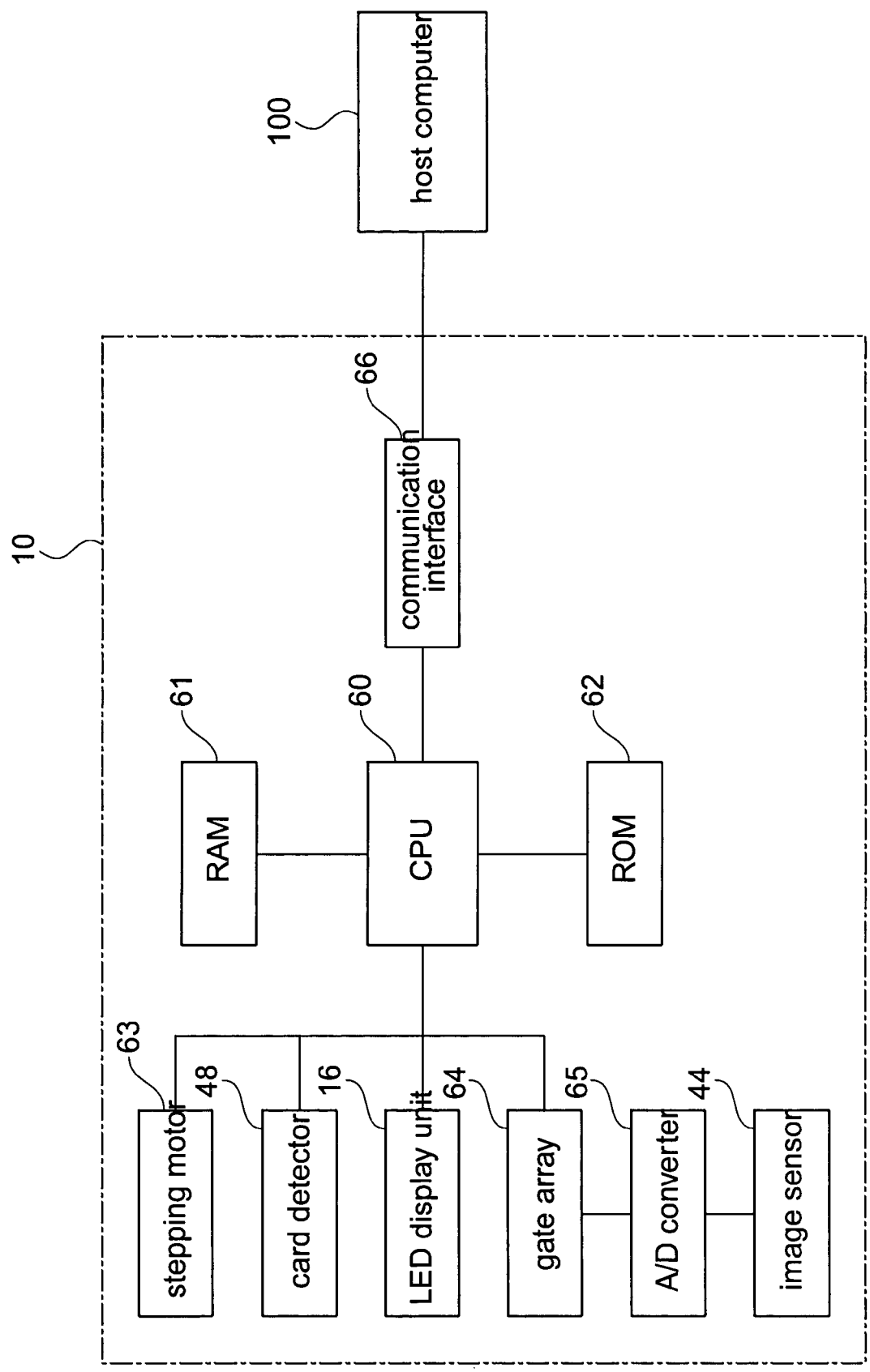
FIG. 5 is a control block diagram of this printer with an image scanning sensor according to the present invention.

The card C imaging operation of this printer 10 is described in detail next. FIG. 5 is a block diagram showing the parts of this printer 10 related to card C imaging control. Note that only the parts related to imaging cards C are described below, and description of the parts for printing and imaging slips S and printing the roll paper P is omitted.

The CPU 60 reads firmware stored in ROM 62 into RAM 61 and runs the firmware to control the stepping motor 63, card detector 48, LED display unit 16, gate array 64, A/D converter 65, image sensor 44, and communication interface 66 in this printer 10.

The stepping motor 63 is a motor that is controlled and turns in steps according to the pulse count of a control pulse signal from the CPU 60. Stepping motor 63 output is transferred through a gear train to the first transportation roller 43a and second transportation roller 46a, and thus drives these rollers. The amount of rotation of the first transportation roller 43a and second transportation roller 46a, that is, the transportation distance of the card C, is thus controlled according to the number of steps advanced by the stepping motor 63.

The card detector 48 detects whether a card C is present in the detection range, that is, whether a card C was inserted from the card insertion opening 41a, or whether the card C was removed from the card insertion opening 41a. The CPU 60 controls card C transportation according to the detection result of the card detector 48. Transportation control of the card C is described in further detail below.

As shown in FIG. 3, the LED display unit 16 has a status indicator LED 16a and an error indicator LED 16b. The status indicator LED 16a lights steady or blinks according to the status of the card C. The error indicator LED 16b lights steady or blinks when there is an error in card C transportation. These LEDs 16a, 16b thus light or flash according to the presence of a card C, the transportation status of a card C, and the presence of any errors, and thereby inform the user of the card C scanning status.

The A/D converter 65 converts one scan line of electrical signals output from the photoelectric conversion elements of the image sensor 44 to digital signals. This A/D converter 65 could be configured to first adjust the offset and gain of the electrical signals from the photoelectric conversion elements before A/D conversion.

The gate array 64 is a line buffer for temporarily storing the digital signals for one scan line output by the A/D converter 65. The line of digital signals stored in the gate array 64 is then sent to RAM 61 and stored in the card image storage area in RAM 61. Each line of image data captured from the card C by the image sensor 44 is sequentially stored to RAM 61 until finally a two-dimensional image of the card C is acquired.

The communication interface 66 controls communication with a host computer 100 external to the printer 10. The communication interface 66 receives and passes control commands from the host computer 100 to the CPU 60. Based on the control commands, the CPU 60 controls imaging the card C, sending the acquired image data to the host computer 100, and changing internal settings of the printer 10.

Figure 6:
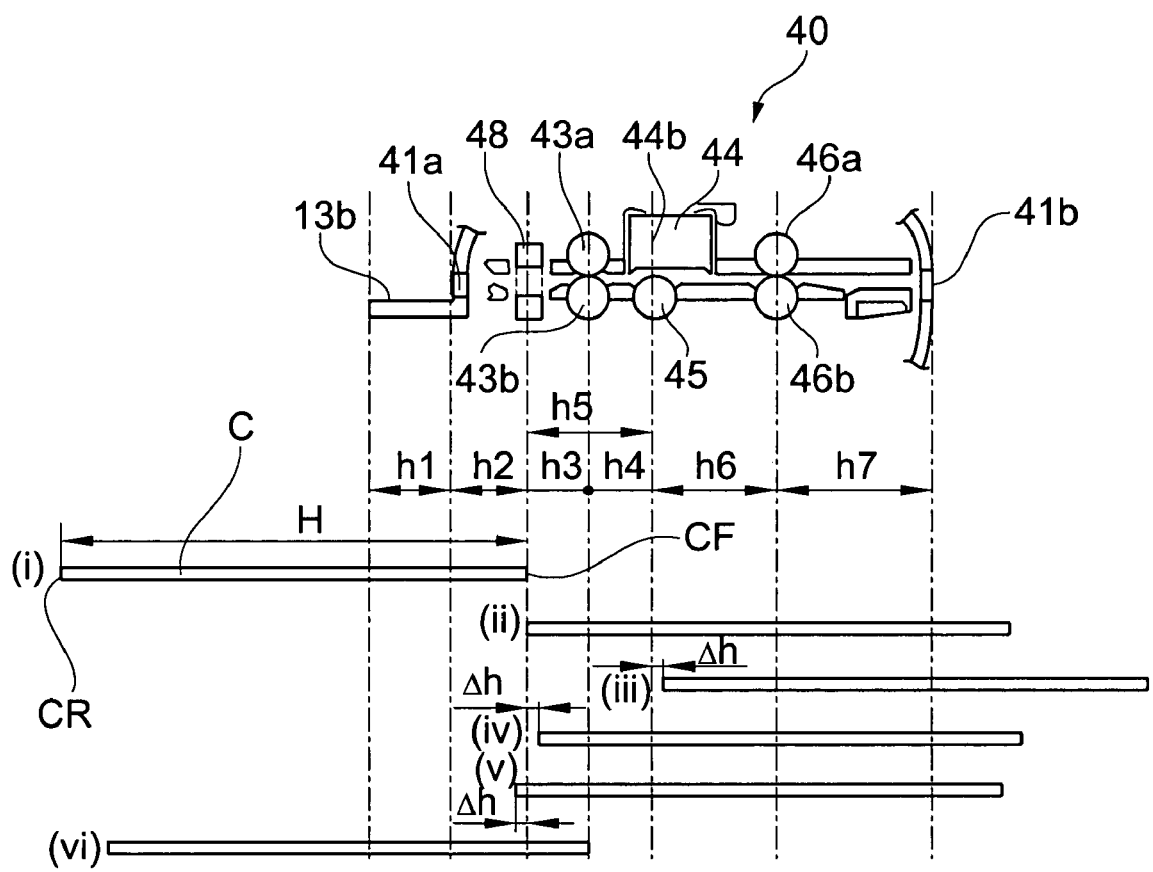
FIG. 6 schematically shows the relative positions of the components of the card image scanning unit of the printer and the position of the card C during the scanning operation.

The card C imaging sequence of this printer 10 is described next below with reference to FIG. 6 to FIG. 12. FIG. 6 schematically shows the relative positions of the components of the card image scanning unit 40 in this printer 10 and the position of the card C during the scanning operation, and FIG. 7 to FIG. 12 are flow charts of the card imaging sequence of this printer 10.

The relative positions of the relevant components of the card image scanning unit 40 in this printer 10 are described first.

As shown in FIG. 6, starting from the table 13*b*, the card image scanning unit 40 has disposed in sequential order card insertion opening 41*a*, card detector 48, first transportation roller 43*a* and first presser roller 43*b*, image sensor 44 and pressure roller 45, second transportation roller 46*a* and second presser roller 46*b*, and then opening 41*b*.

As also shown in FIG. 6, h1 is the length from the outside (front) edge of the table 13*b* to the card insertion opening 41*a*; h2 is the length from the card insertion opening 41*a* to the detection position of the card detector 48; h3 is the length from the detection position of the card detector 48 to contact with the first transportation roller 43*a* and first presser roller 43*b*; h4 is the length from contact with the first transportation roller 43*a* and first presser roller 43*b* to contact with the image sensor 44 and pressure roller 45 (equivalent to the focal position 44*b* of the image sensor 44); h6 is the length from contact with the image sensor 44 and pressure roller 45 to contact with the second transportation roller 46*a* and second presser roller 46*b*; and h7 is the length from contact with the second transportation roller 46*a* and second presser roller 46*b* to the opening 41*b*. In addition, H is the length of the inserted card C in the card insertion direction, and h5 is the sum of lengths h3 and h4 (h5=h3+h4).

The card image scanning unit 40 of this embodiment of the invention was designed primarily for imaging driver licenses, credit cards with a photograph of the cardholder, and similar media. Therefore, the lengths h1 to h7 defined above are as follow in this embodiment of the invention: h1=15 mm, h2=14 mm, h3=11 mm, h4=12 mm, h5=23 mm, h6=22 mm, h7=28 mm, and H=86 mm.

Figure 7:
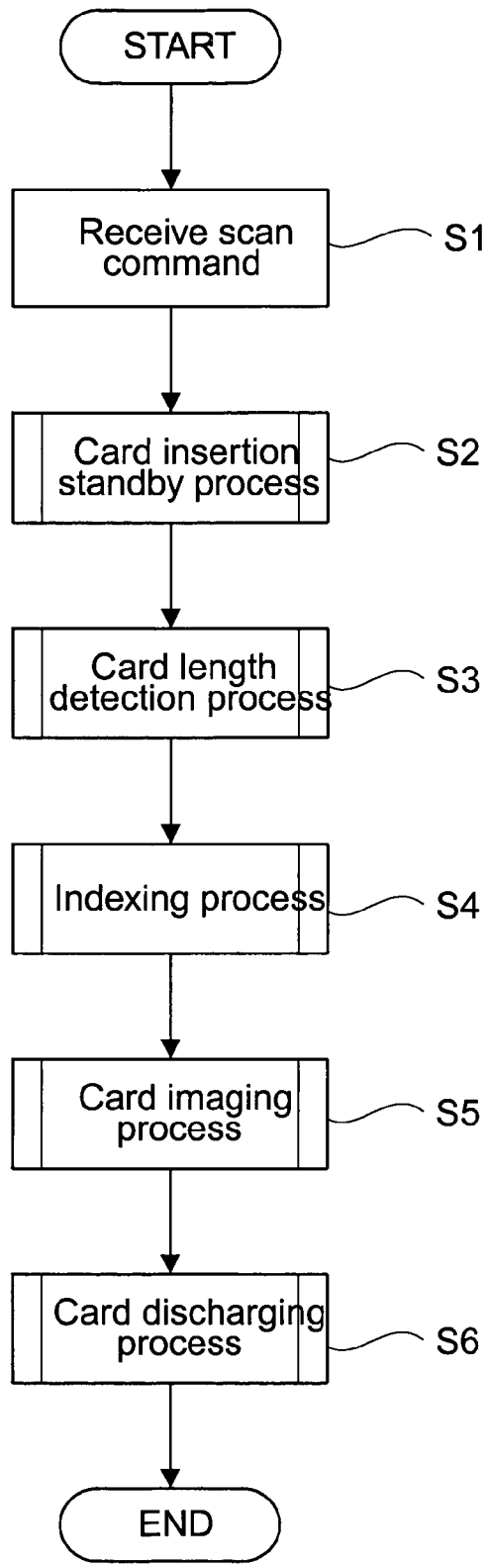
FIG. 7 to FIG. 12 are flow charts of the card scanning sequence of the printer.

The printer 10 images an inserted card C when a scan command telling the printer 10 to image a card C is sent from the host computer 100. As shown in FIG. 7, when the printer 10 receives a scan command from the host computer 100 (S1), it waits until a card C is inserted into the card insertion opening 41*a* (S2). When a card C is inserted, the printer 10 conveys the card C forward (that is, in the direction away from the card insertion opening 41*a*) and detects the transportation length H of the card C (S3). After the card C reaches the scan start position (S4), the card C is scanned while being reversed (conveyed back toward the card insertion opening 41*a*) (S5), and is then discharged from the card insertion opening 41*a* (S6). These individual steps S2 to S6 are described in further detail below.

Figure 8:
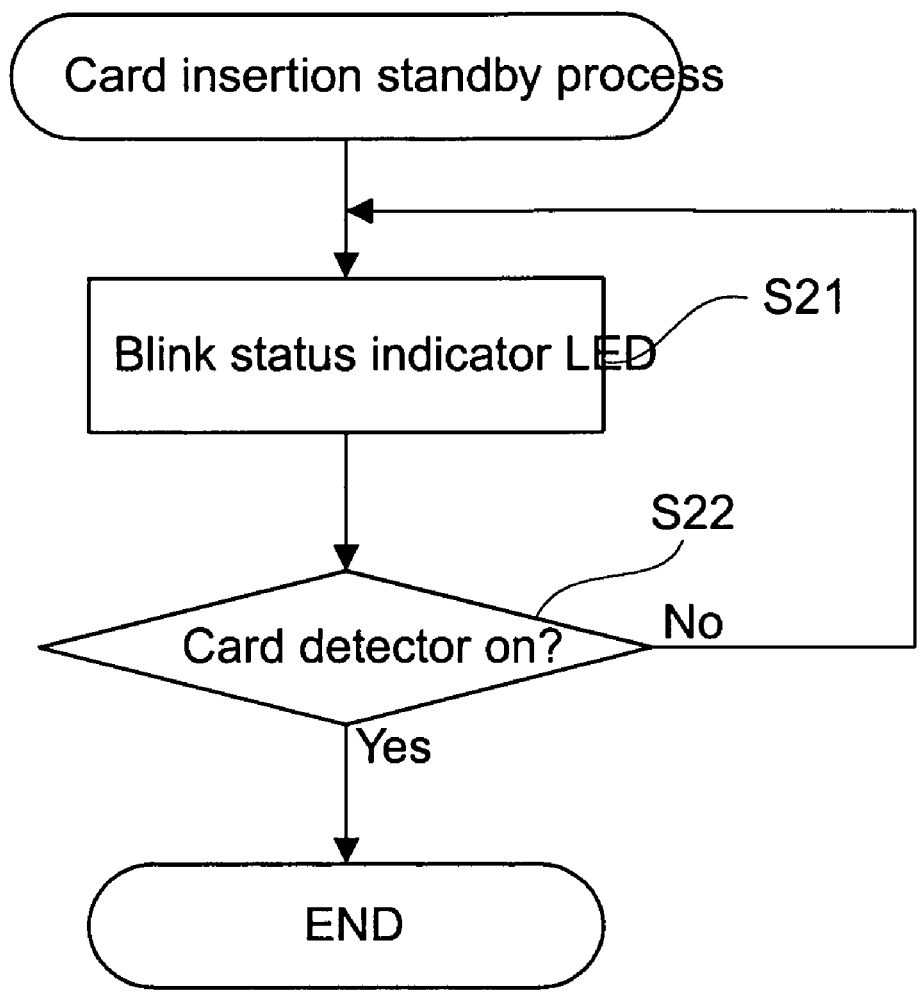

When the printer 10 receives a scan command from the host computer 100 (FIG. 7, S1), the card insertion standby process shown in FIG. 8 starts. The printer 10 thus moves to a card insertion standby state, and flashes the status indicator LED 16*a* (S21). In this implementation of the invention the status indicator LED 16*a* blinks according to a first flashing pattern to prompt the user to insert a card C.

The printer 10 then checks if the card detector 48 turned ON, that is, whether the card C was inserted through the card insertion opening 41*a* to the card transportation path 41 and the card detector 48 detected a card C (S22). If the card C is detected, the card C was inserted length h2 or more from the card insertion opening 41*a* (state i in FIG. 6). If a card C is detected (S22 returns yes), the card insertion standby process ends, and the card length detection process (FIG. 7, S3) runs. If a card C is not detected (S22 returns no), steps S21 and S22 repeat until a card C is detected.

If insertion of a card C is not detected for a predetermined time, the printer 10 could report to the host computer 100 that no card C was inserted, cancel the card insertion standby state, and resume the previous mode.

Furthermore, in order for the card C to be transported by the first transportation roller 43*a* and first presser roller 43*b*, it must be inserted length (h2+h3) from the card insertion opening 41*a* so that the leading edge CF of the card C contacts the first transportation roller 43*a* and first presser roller 43*b*. This embodiment of the invention therefore returns to the card insertion standby state if the card C is not transported so that the trailing edge CR of the card C is positioned at the scan start position within a predetermined time even though the card C was detected because, for example, the leading edge CF of the card C was not inserted far enough for the card C to be nipped and conveyed by the first transportation roller 43*a* and first presser roller 43*b*.

Figure 9:
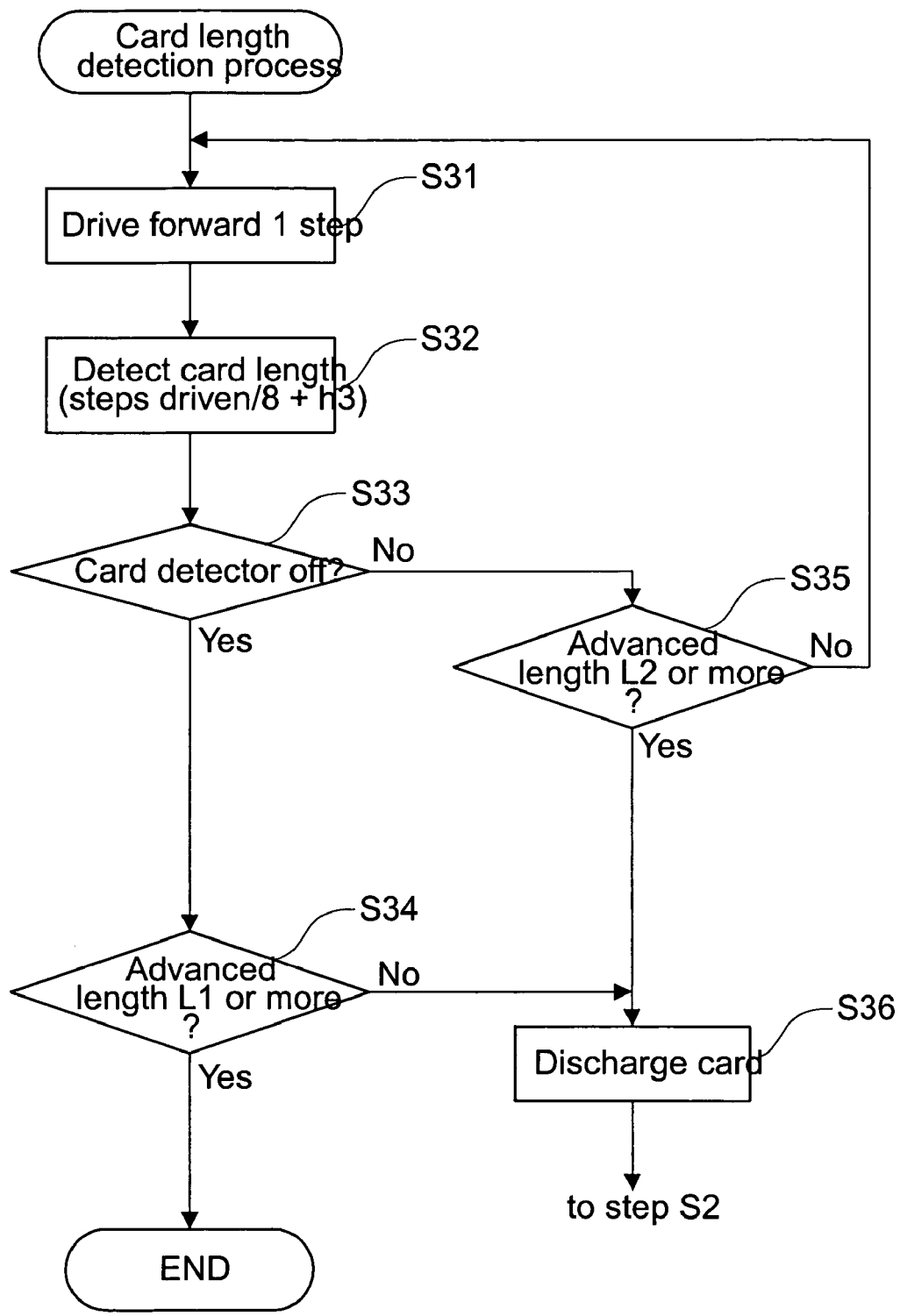

In the card length detection process the status indicator LED 16*a* switches from blinking to lighting steady. In addition, as shown in FIG. 9, the stepping motor 63 is driven one step forward based on the pulse signal from the CPU 60, thereby turning the first transportation roller 43*a* and advancing the card C forward the distance equal to one step (for example, approximately 0.125 mm) (S31). The CPU 60 then starts accumulating the card C transportation distance to detect the length of the card C (the length in the transportation direction) (S32). This embodiment of the invention calculates the card length (mm) by dividing the number of drive steps of the stepping motor 63 by 8 to acquire the transportation distance, and adding this transportation distance to length h3.

Whether output from the card detector 48 turned off is then checked (S33). If the card detector 48 output is turned off, the trailing edge CR of the card C is known to be on the side of the opening 41*b* of the card detector 48 (state ii in FIG. 6). If card detector 48 output is still on, the trailing edge CR of the card C is known to be on the side of the card insertion opening 41*a* of the card detector 48.

If the trailing edge CR of the card C has traveled beyond the detection position of the card detector 48 (S33 returns yes), whether the transportation distance is greater than or equal to a specific length L1 (for example, 40 mm, equivalent to 320 steps) is determined (S34). If it is greater than or equal to L1

(S34 returns yes), the card length detection process ends, and the indexing process (FIG. 7, S4) starts.

The printer 10 uses the value acquired in step S32 when the card length detection process ends as the length H of the card C.

If the transportation distance is less than L1 (S34 returns no), the card C is ejected from the card insertion opening 41a (S36), and the card insertion standby process resumes (FIG. 7, S2).

This embodiment of the invention ejects the card C by conveying it in reverse by the calculated card length (that is, the transportation distance to this point plus h3). In other words, the card C is simply reversed the same distance that it was conveyed into the transportation path.

If the trailing edge CR of the card C has not passed the detection position of the card detector 48 (S33 returns no), whether the transportation distance is greater than specified length L2 (L2>L1, and L2=240 mm (equivalent to 1920 steps) in this embodiment) is determined (S35). If less then L2 (S35 returns no), steps S31 to S33 repeat. If the card detector 48 output remains on even though the stepping motor 63 has advanced L2 or more (S35 returns yes), the card C is ejected from the card insertion opening 41a (S36), and the card insertion standby process resumes (FIG. 7, S2).

If the detected length of the card C is too short (including when the card C is pushed in from the card insertion opening 41a or pulled out from the opening 41b) or too long (including when the card C is pulled out from the card insertion opening 41a or pushed in from the opening 41b), the printer 10 thus ejects the card C by executing steps S34 to S36 without imaging the card C, and returns to the card insertion standby process. This prevents errors that can result from the length of the card C being outside predefined limits.

Figure 10:
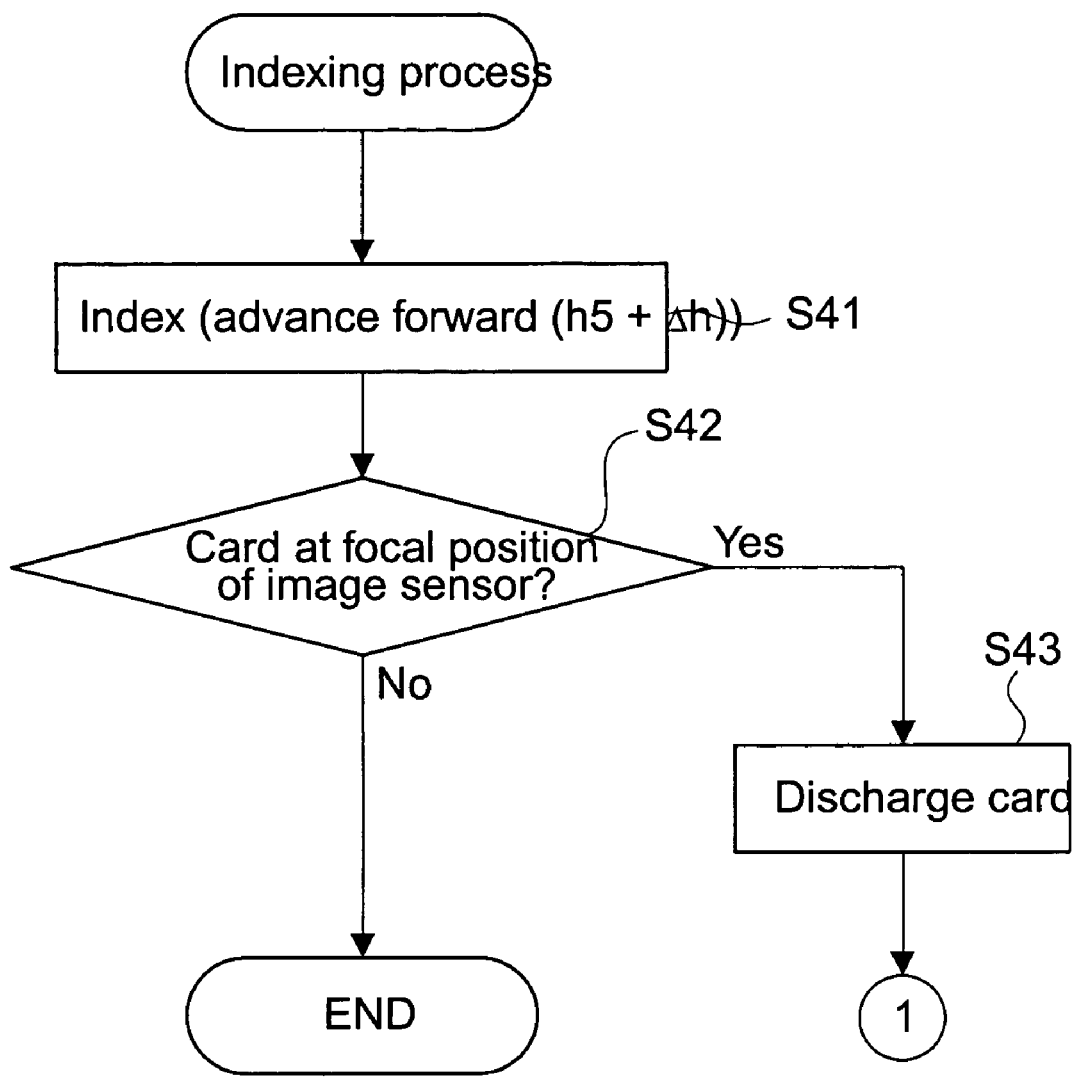

Referring to FIG. 10, when the indexing process starts, the stepping motor 63 drives forward to advance the card C length (h5+Δh) in the forward direction to position the trailing edge CR of the card C at a distance of Δh from the focal position 44b of the image sensor 44 toward the opening 41b (S41). This is shown as state iii in FIG. 6. The card C is advanced Δh (=0.75 mm, equivalent to 6 steps) beyond the focal position 44b in this embodiment to compensate for backlash in the transportation mechanism and differences in parts precision.

The CPU 60 then drives the image sensor 44 to image the card C and detect the card, and checks if the card C is at the focal position 44b of the image sensor 44 (S42). If operation is normal, the card C is not at the focal position 44b of the image sensor 44 (S42 returns no), indexing stops, and the card imaging process starts (FIG. 7, S5). If the card C is detected at the focal position 44b of the image sensor 44 (S42 returns yes), the CPU 60 determines that an error occurred. The card C is therefore ejected (S43) and operation proceeds from step S62 in FIG. 12. As in step S36 described above, the card C is discharged the detected card length.

Figure 11:
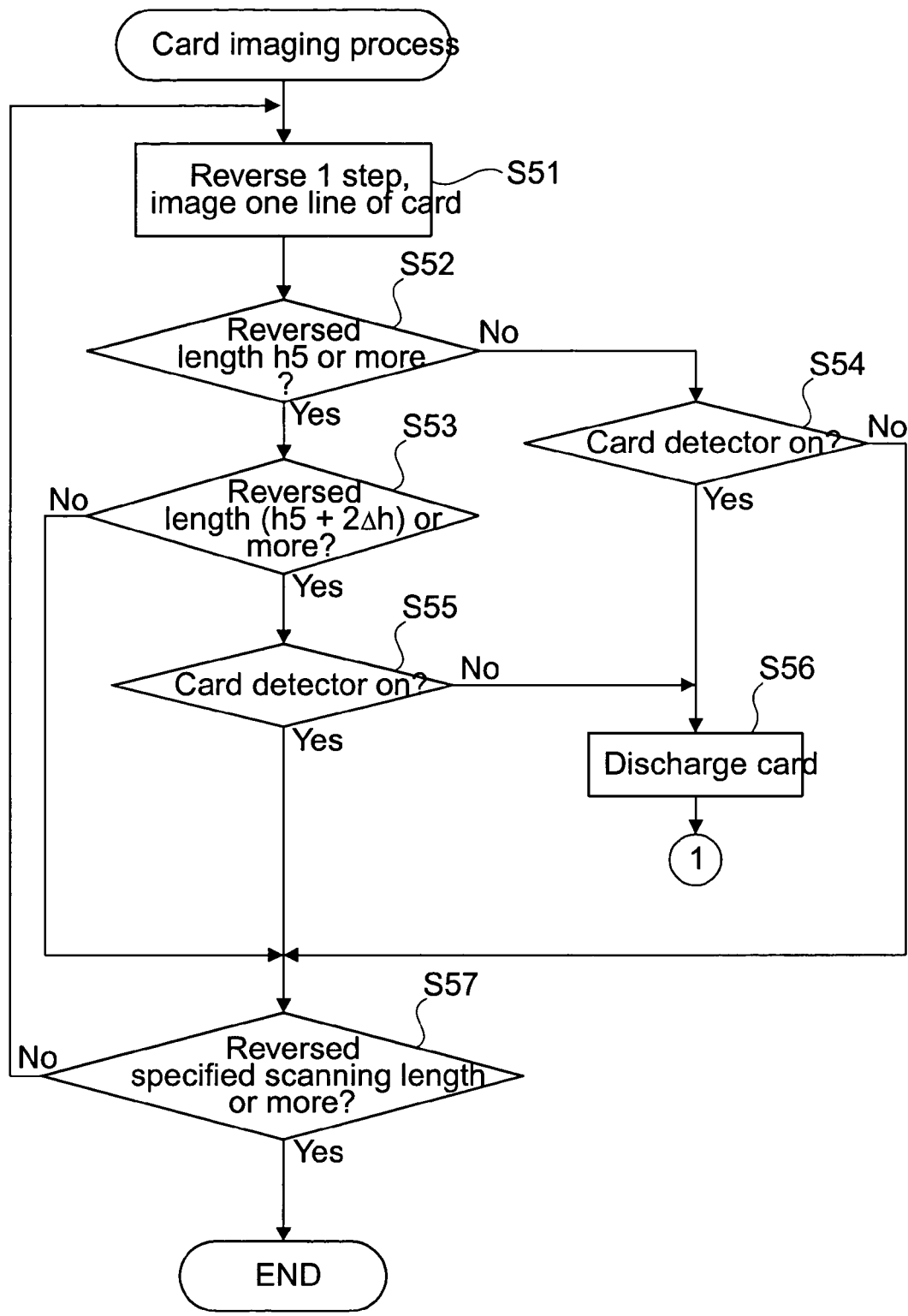

Referring to FIG. 11, when the card imaging process starts, the card C is reversed the distance of one step. In other words, the card C is transported the distance of one step of the stepping motor 63 from the scan start position toward the card insertion opening 41a with the trailing edge CR of the card C now leading, and the image sensor 44 images the one line of the card C at the focal position 44b (S51).

After the card imaging process starts, the CPU 60 determines if the card C was advanced length h5 or more (S52). If the card C has traveled less than h5 (S52 returns no), the CPU 60 determines if the card detector 48 output is on (S54). If the card C has traveled less than h5, the card C is located at position iv in FIG. 6, and if the card C is being conveyed normally, the trailing edge CR of the card C should not be detected by the card detector 48. Checking the output from the card detector 48 can therefore be used to determine if the card C is being conveyed normally. Assuming that transportation is normal if the card C is not detected, step S57 executes if card detector 48 output is off (S54 returns no). However, if the card detector 48 output is on (S54 returns yes), indicating that the card C was detected and some error therefore occurred, the card C is ejected by the detected card length (S56), and operation proceeds from step S62 in FIG. 12.

If the card C has traveled at least h5 (S52 returns yes), whether the card C has traveled length (h5+2Δh) or more since the card imaging process started is determined (S53). If the card C has traveled (h5+2Δh) or more (S53 returns yes), whether card detector 48 output is on or not is determined (S55).

That the card C has traveled (h5+2Δh) or more means that the card C is positioned at state v in FIG. 6, and if the card C is being transported normally, the card C should be detected by the card detector 48. Output from the card detector 48 can therefore be used to determine if the card C is being conveyed normally. Assuming that transportation is normal if the card C is detected, step S57 executes if the output of the card detector 48 is on (S55 returns yes). Conversely, an error has likely occurred if the card C is not detected. Therefore, if the card detector 48 output is off (S55 returns no), the card C is discharged by the detected card length (S56), and operation continues from step S62 in FIG. 12.

In step S57, the CPU 60 determines if the card C was conveyed a predetermined scanning length or more since the card imaging process started. This specified scanning length is determined according to the size of the scanned card C, and is stored as a parameter in RAM 61 or ROM 62. If the scanned card C is a driver license or credit card, for example, the specified scanning length is set to 90 mm. If the card C has been conveyed this specified scanning length or more (S57 returns yes), imaging the card C is assumed to have finished and the card discharge process (FIG. 7, S6) executes. However, if the card C has not traveled this specified scanning length (S57 returns no), control returns to step S51 and steps S51 to S57 repeat to scan the card C for the specified scanning length.

Figure 12:
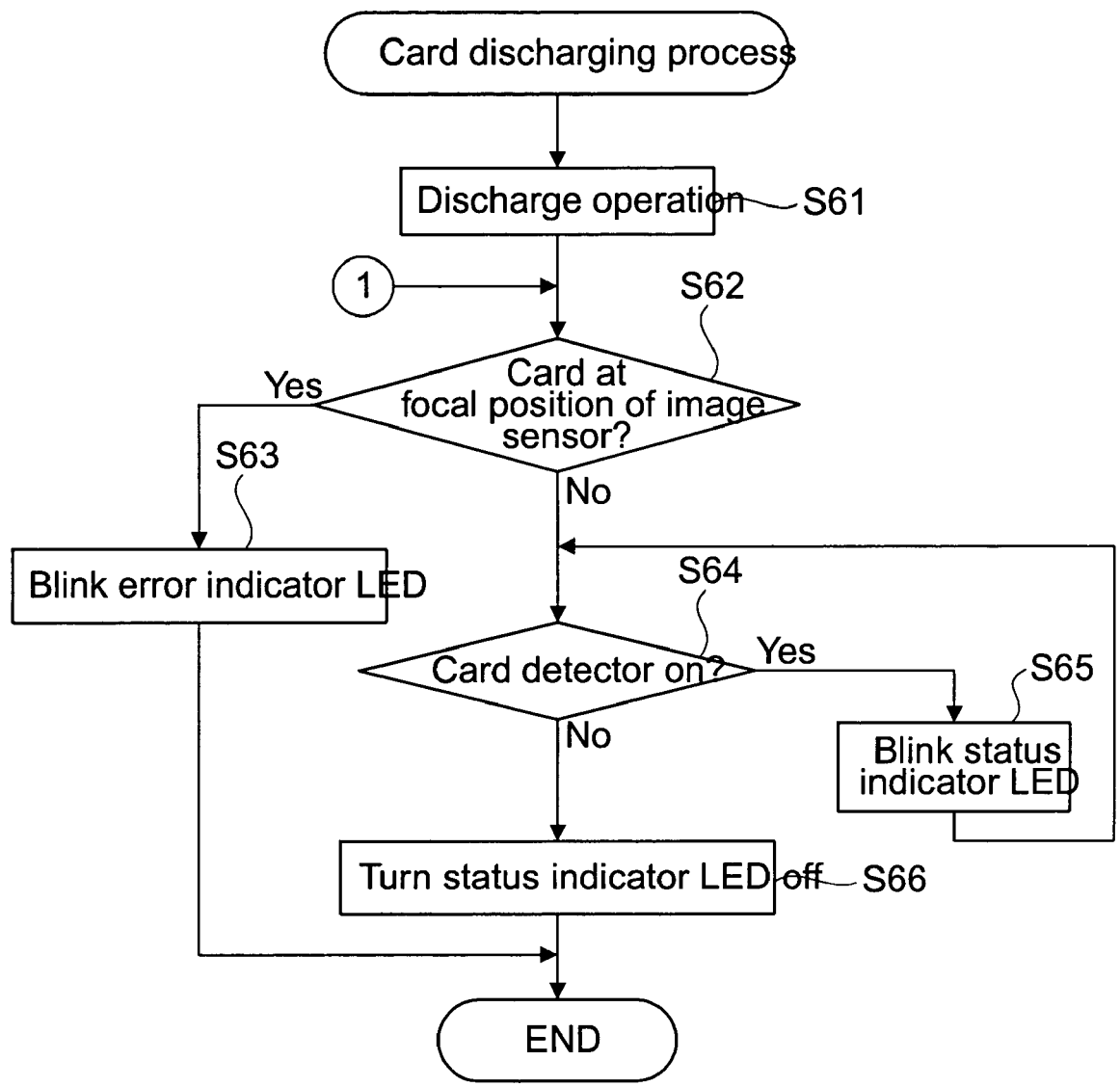
Figure 13:
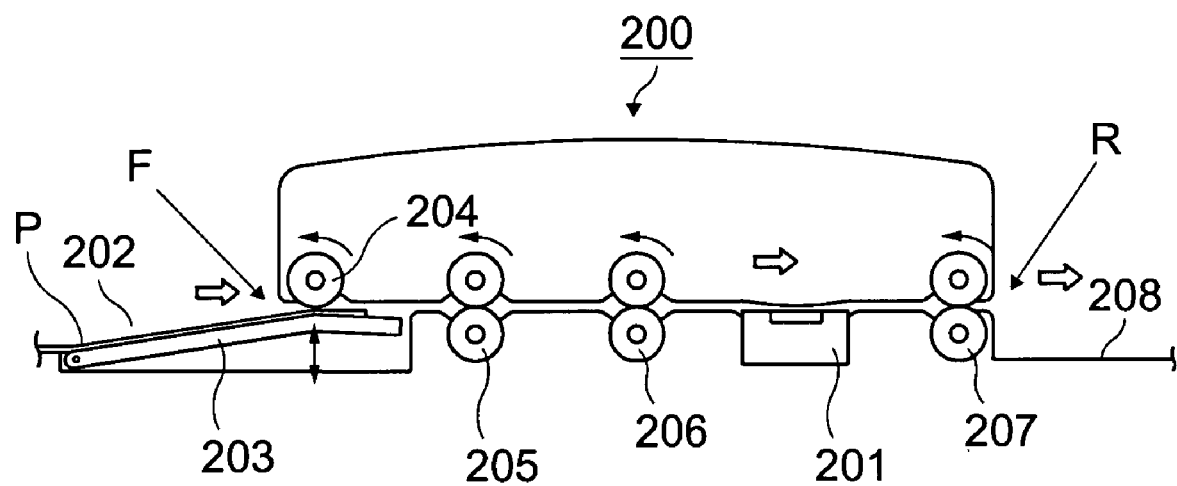
FIG. 13 is a schematic diagram of a sheetfed image scanner according to the prior art.

In the card discharge process as shown in FIG. 12, the card C is transported to the side of the card insertion opening 41a the length determined from the following equation, and the card C is discharged (S61). The leading edge CF of the card C is thus positioned to the card insertion opening 41a from where it is nipped by the first transportation roller 43a and first presser roller 43b, that is, at position vi shown in FIG. 6.

It will be obvious that the following is just one way to calculate this distance, and it sufficient that the card C be conveyed to position vi shown in FIG. 6.

card transportation distance=(detected card length)+
h5−(specified scanning length)

The CPU 60 then drives the image sensor 44 to detect the card and determine if the card C is present at the focal position 44b of the image sensor 44 (S62). If operation is normal, the card C should not be at the focal position 44b of the image sensor 44. Therefore, if the card C is at the focal position 44b of the image sensor 44 (S62 returns yes), an error is determined to have occurred. The error indicator LED 16b is therefore driven to blink and notify the user that an error occurred (S63).

However, if the card C is not present at the focal position 44b of the image sensor 44 (S62 returns no), the status of the card detector 48 is determined (S64). If the card detector 48 is on (S64 returns yes), the card C is near the card detector 48.

The status indicator LED 16*a* is therefore driven to blink to prompt the user to remove the card C (S65), and step S64 then repeats in a card removal standby state. The status indicator LED 16*a* blinks in a second flashing pattern different from the first flashing pattern used in the card insertion standby state described above (S21 to S22).

If the user removes the card C from the card insertion opening 41*a* and card detector 48 output goes off (S64 returns no), the status indicator LED 16*a* is turned off (S66), and the card discharge process ends.

Though not shown in the figures, if the card C is not transported and the trailing edge CR of the card C is not positioned at the scan start i.e. indexing position within a predetermined time even though the card C was detected in step S22, this embodiment of the invention returns to the card insertion standby state again. Therefore, because the card insertion standby state resumes after a predetermined time if the card C cannot be transported even though the leading edge of the card C is between the first transportation roller 43*a* and card detector 48 and the card C is detected, operation will not stop completely.

The card C could also be pushed from the side of the card insertion opening 41*a* to the side of the opening 41*b* while the card C is being carried from the card insertion opening 41*a* to the indexing position by the first transportation roller 43*a* or second transportation roller 46*a*. The detected card length could be shorter than the actual card length in this situation, but if the card length is shorter than specified length L1, the card C will not be scanned, and there is no problem. Furthermore, even if the detected card length is L1 or greater, the card C will be scanned for the specified scanning length from the trailing edge CR of the card C, and there is no problem scanning the card C.

The user could also attempt to pull the card C out from the card insertion opening 41*a* while the card C is being carried from the card insertion opening 41*a* to the indexing position by the first transportation roller 43*a* or second transportation roller 46*a*. The detected card length in this situation might be longer than the actual card length, but if the detected card length is greater than specified length L2, the card C will be discharged without being scanned, and there is no problem. Furthermore, even if the detected card length is shorter than L2, the card C will be scanned for the specified scanning length from the trailing edge CR of the card C, and there is no problem scanning the card C.

Furthermore, if the card C is pulled completely out from the card insertion opening 41*a*, an error is detected in step S34 and processed accordingly. Operation will therefore not be determined to have ended normally despite such error.

Likewise, if the card C is pulled completely out from the card insertion opening 41*a* while the card C is being scanned, an error is detected in step S55 and processed accordingly. Operation will therefore not be determined to have ended normally despite such error.

The card C could also be pushed from the side of the opening 41*b* to the side of the card insertion opening 41*a* while the card C is being carried by the first transportation roller 43*a* or second transportation roller 46*a* from the card insertion opening 41*a* to the indexing position. If the card is thus pushed before the card length is detected, the detected card length will be greater than the actual card length. However, if the detected card length is length L2 or greater, the card C will be ejected without being scanned, and there is no problem. Furthermore, even if the detected card length is shorter than L2, the card C will be scanned for the specified scanning length from the trailing edge CR of the card C, and there is no problem scanning the card C.

Likewise, if the card is pushed from the opening 41*b* after the card length is detected, step S42 detects that the card C was not properly indexed. The card C will therefore be discharged without scanning, and there is no problem.

The user could also attempt to pull the card C out from the opening 41*b* while the card C is being conveyed by the first transportation roller 43*a* or second transportation roller 46*a* from the card insertion opening 41*a* to the indexing position. If the card C is pulled from the opening 41*b* before the card length is detected, the detected card length might be shorter than the actual card length. However, if the detected card length is shorter than length L1, the card C will be ejected without being scanned, and there is no problem. Furthermore, if the detected card length is L1 or greater, the card C will be scanned for the specified scanning length from the trailing edge CR of the card C, and there is no problem scanning the card C.

Furthermore, if the card C is pulled completely out from the opening 41 b, an error is detected in step S34 and processed accordingly. Operation will therefore not be determined to have ended despite such error.

Likewise, if the card C is pulled partially or completely from the opening 41*b* after the card length is detected, the card C will not be detected in step S55. Scanning therefore stops, the card C is discharged, and no problem occurs.

The imaging scanning sequence according to the present invention thus assures appropriate imaging and error processing even when operating errors occur, and the printer 10 will therefore not stop operating.

The present invention has been described with reference to a printer 10 having an imaging sensor, but the invention shall not be so limited. More specifically, the invention can also be used in sheetfed scanner with the same benefits.

An image scanner and image scanning method according to the present invention adjust the orientation of the scanned medium inserted from a medium insertion opening by means of guide members while conveying the medium forward, then images the scanned medium while conveying it in reverse, and finally discharges the scanned medium from the same insertion opening. The scanned medium can therefore always be scanned and imaged while correctly aligned in the transportation direction. Inserting and removing the scanned medium are also easier, and operability is improved.

Furthermore, because the presence of a scanned medium in the transportation path is detected and operation is controlled using one medium detector and imaging sensor (scanner), an image scanner featuring a simple construction and not requiring multiple detectors can be provided.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image scanning apparatus comprising:
a transportation mechanism for transporting a medium along a substantially straight transportation path from an insertion opening through which the medium is inserted;
an image sensor for scanning an image of the medium along the transportation path, the image sensor having a focal position at which the image is scanned;
a driving assembly for driving the transportation mechanism to transport the medium in a forward direction along the transportation path from an insertion opening toward an indexing position downstream of the focal position and to transport the medium in a reverse direction, opposite the forward direction, toward the insertion opening to discharge the medium, a length detector for detecting the distance traveled by the medium along the transportation path relative to the insertion opening;

a control unit for controlling the transportation mechanism to transport the medium to a position to be scanned by the image sensor when the length detector detects a distance within a first specified range defined by a first specified value (L1) and a second specified value (L2) greater than the first specified value (L2>L1) and wherein the control unit controls the transportation mechanism to discharge said medium from said insertion opening when the detected distance detected by said length detector is greater than or equal to a second specified distance defined by the second specified value (L2).

2. The apparatus of claim 1, further comprising: a CPU for performing said-comparison wherein said control unit is responsive to said CPU output and to said length detector for initiating the scanning of said image by said image sensor.

3. The apparatus of claim 1, wherein said control unit controls the transportation mechanism to discharge said medium from said insertion opening when the detected distance is less than or equal to a first specified distance defined by the first specified value.

4. The apparatus of claim 1, further comprising a medium detector disposed on the transportation mechanism for detecting the presence or absence of the medium in the transportation path wherein the control unit stops imaging the medium by the image sensor and controls the transportation mechanism to discharge the medium from the insertion opening if the medium detector detects the medium before the transportation distance of the medium when transported in reverse from the indexing position reaches a third specified value.

5. The apparatus of claim 1, further comprising a medium detector disposed on the transportation mechanism for detecting the presence or absence of the medium in the transportation path wherein the control unit stops imaging the medium by the image sensor and controls the transportation mechanism to discharge the medium from the insertion opening if the medium detector does not detect the medium before the transportation distance of the medium when transported in reverse from the indexing position reaches a fourth specified value.

6. The apparatus of claim 1, wherein said medium being scanned is a card.

7. The apparatus of claim 6, where said card includes a photograph.

8. A printer including an image scanning apparatus comprising:

a transportation mechanism for transporting a medium along a substantially straight transportation path from an insertion opening through which the medium is inserted;

a roll paper compartment for storing the roll paper, an image scan unit for scanning an image of the medium, with the image sensor having a focal position at which the image is scanned;

a driving assembly for driving the transportation mechanism to transport the medium in a forward direction along the transportation path from the insertion opening toward an indexing position downstream of the image scan unit and to transport the medium in a reverse direction, opposite to the forward direction, toward the insertion opening to discharge the medium, a length detector for detecting the distance traveled by the medium along the transportation path relative to the insertion opening; and a control unit for initiating the scanning of the medium by the image sensor when the length detector detects a distance between a first specified value (L1) and a second specified value (L2) greater than the first specified value (L2>L1) and with the control unit initiating the discharge of the medium from the insertion opening by the transportation mechanism without scanning the image of the medium when the detected distance is more than the second specified value (L2).

9. A printer as defined in claim 8 further comprising:

a medium detector disposed adjacent said insertion opening or said transportation mechanism for detecting the presence or absence of the medium in the transportation path;

the length detector for detecting the distance being traveled by said medium along said transportation path relative to the card insertion position; and a comparator for providing a comparator output based upon a comparison of the distance detected by said length detector and a specified value; wherein said control unit is responsive to said comparator output and to said length detector for initiating the scanning of said image by said image sensor when the comparison output is within a first specified range and for controlling said transportation mechanism to discharge said medium from said insertion opening when the comparison output is within a second specified range outside said first range.

10. An image scanning method for controlling the scanning of an image of a medium being moved along a substantially straight transportation path from an initial position corresponding to an opening through which the medium enters the transportation path using an image sensor in contact with the medium, comprising the steps of:

(a) detecting the presence and absence of the medium on said transportation path;

(b) measuring the distance being traveled by said medium along said transportation path relative to the initial position;

(c) moving the medium from the initial position along the transportation path in a forward direction toward an indexing position for scanning said medium;

(d) reversing the direction of movement of said medium toward said first position;

(e) imaging the medium at said indexing position while the medium moves in the reverse direction of movement;

(f) executing step (e) after step (d) if the distance measured in step (b) is within a specified range defined by a first specified value (L1) and a second specified value (L2) greater than the first specified value (L2>L1); and (g) executing step (d) for discharging the medium from said initial position without executing step (e) if the distance measured in step (b) is greater than or equal to a second specified distance defined by the second specified value.

11. The method of claim 10, wherein step (c) is stopped and step (d) is executed if step (a) does not detect the medium before the transportation distance of the medium when transported in reverse from the indexing position reaches a fourth specified value.

12. The method of claim 10 wherein the scanned medium is a card.

13. The method of claim 12 wherein the card includes a photograph.

14. The method of claim 11 wherein the scanned medium is a card having a photograph.

15. A data storage medium containing a program for executing on a computer each of the steps in the image scanning method of claim 10.

16. An image scanning apparatus comprising:
- a transportation mechanism including a first and second set of transportation rollers for transporting a medium along a substantially straight transportation path from an insertion opening through which the medium is inserted;
- a driving assembly for driving the transportation mechanism for transporting the medium in a forward direction along the transportation path from the insertion opening toward a specified indexing position downstream of said second set of transportation rollers and for driving said medium in a reverse direction opposite to said forward direction and toward the insertion opening for discharging the medium,
- an image sensor in contact with the medium between the first and second set of transportation rollers for scanning an image of the medium when being driven in the reverse direction, said image sensor having a given focal position at which the image is scanned;
- a length detector for detecting the distance traveled by the medium along the transportation path relative to the insertion opening; and
- a control unit for controlling the operation of the driving assembly such that the direction of the medium is reversed from the forward direction back toward the insertion opening without scanning the medium and before the medium passes the second set of transportation rollers when the detected distance detected by said length detector is equal or greater than a specified distance.

* * * * *